(12) United States Patent
Zhang et al.

(10) Patent No.: US 9,143,955 B2
(45) Date of Patent: Sep. 22, 2015

(54) DETECTING AND REPORTING PHYSICAL-LAYER CELL IDENTIFIER COLLISIONS IN WIRELESS NETWORKS

(75) Inventors: Xiaoxia Zhang, San Diego, CA (US); Ke Liu, San Diego, CA (US); Kapil Bhattad, San Diego, CA (US); Taesang Yoo, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 329 days.

(21) Appl. No.: 13/101,877

(22) Filed: May 5, 2011

(65) Prior Publication Data
US 2011/0274097 A1 Nov. 10, 2011

Related U.S. Application Data

(60) Provisional application No. 61/332,372, filed on May 7, 2010.

(51) Int. Cl.
*H04W 4/00* (2009.01)
*H04W 24/02* (2009.01)
(Continued)

(52) U.S. Cl.
CPC .............. *H04W 24/02* (2013.01); *H04W 48/08* (2013.01); *H04W 16/14* (2013.01)

(58) Field of Classification Search
CPC ..... H04W 84/12; H04W 80/04; H04W 84/18; H04W 88/06; H04W 74/08
USPC .................................. 370/338, 310, 241, 254
See application file for complete search history.

(56) References Cited

U.S. PATENT DOCUMENTS 8,401,033 B2 3/2013 Palanki et al.
2007/0207738 A1* 9/2007 Nakayama et al. .......... 455/63.1
(Continued)

FOREIGN PATENT DOCUMENTS

CN 101496428 A 7/2009
CN 101656941 A 2/2010
(Continued)

OTHER PUBLICATIONS

Amirijoo M et al., "Neighbor Cell Relation List and Physical Cell Identity Self-Organization in LTE", May 19, 2008, Communications Workshops, 2008, ICC Workshops 08, IEEE International Conference on, IEEE, Piscataway, NJ, USA, pp. 3741, XP031265200, ISBN: 978-1-4244-2052-0.
(Continued)

*Primary Examiner* — Andrew Lai
*Assistant Examiner* — Zhiren Qin
(74) *Attorney, Agent, or Firm* — Dalei Dong

(57) ABSTRACT

Physical-Layer Cell Identifier (PCID) collisions may occur in a wireless network when two neighboring evolved Node Bs (eNBs) having different Global Cell Identifiers (GCID) select identical PCIDs. Evolved Node Bs may uniquely identify themselves by transmitting on a broadcast channel, such as a Physical Broadcast Channel (PBCH), a pattern of bits corresponding to the eNB's GCID. Individual User Equipments (UEs) may recognize the PCID collision by decoding the PBCH payload to identify different GCID-modulated payloads from two eNBs involved in the PCID collision. Alternatively, UEs may detect PCID collisions in the wireless network by monitoring Primary Synchronization Signals (PSS) and Secondary Synchronization Signals (SSS) on the PBCH for identical signals separated by a relatively large time offset. After detecting a PCID collision, the UEs may attempt by best effort to report the PCID collision, may report to a fallback eNB, or the UEs may use special resources on an uplink channel.

33 Claims, 10 Drawing Sheets

(51) Int. Cl.
*H04W 48/08* (2009.01)
*H04W 16/14* (2009.01)

(56) References Cited

U.S. PATENT DOCUMENTS

| | | | |
|---|---|---|---|
| 2007/0230600 A1* | 10/2007 | Bertrand et al. | 375/260 |
| 2009/0116473 A1* | 5/2009 | Lindoff et al. | 370/350 |
| 2009/0197631 A1* | 8/2009 | Palanki et al. | 455/522 |
| 2009/0219905 A1 | 9/2009 | Khandekar et al. | |
| 2010/0008235 A1 | 1/2010 | Tinnakornsrisuphap et al. | |
| 2010/0177683 A1* | 7/2010 | Lindoff et al. | 370/328 |
| 2010/0178912 A1* | 7/2010 | Gunnarsson et al. | 455/423 |
| 2011/0063989 A1* | 3/2011 | Yang et al. | 370/252 |
| 2011/0267937 A1* | 11/2011 | Yoo et al. | 370/201 |
| 2012/0287875 A1* | 11/2012 | Kim et al. | 370/329 |

FOREIGN PATENT DOCUMENTS

| | | |
|---|---|---|
| JP | 2010537479 A | 12/2010 |
| WO | WO-2009022974 A1 | 2/2009 |
| WO | 2009043216 A1 | 4/2009 |
| WO | 2009111483 A2 | 9/2009 |
| WO | 2010006298 A1 | 1/2010 |
| WO | 2010105228 A1 | 9/2010 |

OTHER PUBLICATIONS

Huawei: "Detection of conflicting cell identities," 3GPP Draft; R3-071947, 3rd Generation Partnership Project (3GPP), Mobile Competence Centre; Sophia-Antipolis Cedex ; France , XP050162733 [retrieved on Oct. 3, 2007] the whole document.

International Search Report and Written Opinion—PCT/US2011/035634, ISA/EPO—Aug. 19, 2011.

Qualcomm Europe: "UE-assisted heuristic detection of PCI collision", Sep. 23, 2008, 3GPP Draft; R2-085380 UE Assisted Heuristic Collision Detection, 3rd Generation Partnership Project (3GPP), Mobile Competence Centre; 650, Route Des Lucioles; F-06921 Sophia-Antipolis Cedex; France, XP050320229, [retrieved on Sep. 23, 2008].

* cited by examiner

DETECTING AND REPORTING PHYSICAL-LAYER CELL IDENTIFIER COLLISIONS IN WIRELESS NETWORKS

CROSS-REFERENCE TO RELATED APPLICATION

This application claims the benefit under 35 U.S.C. §119(e) to U.S. Provisional Patent Application No. 61/332,372, entitled, "METHODS AND SYSTEMS FOR DETECTING AND REPORTING PHYSICAL-LAYER CELL IDENTIFIER COLLISIONS IN WIRELESS NETWORKS", filed on May 7, 2010, the disclosure of which is expressly incorporated by reference herein in its entirety.

BACKGROUND

1. Field

Aspects of the present disclosure relate generally to wireless communication systems, and more particularly to detecting and reporting Physical-Layer Cell Identifier (PCID) collisions.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Offered is a method of communicating in a wireless network. The method includes receiving wireless signals from at least one neighboring base station. The method also includes determining, from the received wireless signals, whether the received signals correspond to neighboring base stations that have a common Physical-Layer Cell Identifier (PCID).

Offered is an apparatus for wireless communication. The apparatus includes means for receiving wireless signals from at least one neighboring base station. The apparatus also includes means for determining, from the received wireless signals, whether the neighboring base stations have a common Physical-Layer Cell Identifier (PCID).

Offered is a computer program product for wireless communication in a wireless network. The computer program product includes a non-transitory computer-readable medium having non-transitory program code recorded thereon. The program code includes program code to receive wireless signals from at least one neighboring base station. The program code also includes program code to determine, from the received wireless signals, whether the neighboring base stations have a common Physical-Layer Cell Identifier (PCID).

Offered is an apparatus for wireless communication. The apparatus includes a memory and a processor(s) coupled to the memory. The processor(s) is configured to receive wireless signals from at least one neighboring base station. The processor(s) is also configured to determine, from the received wireless signals, whether the neighboring base stations have a common Physical-Layer Cell Identifier (PCID).

Offered is a method of communicating in a wireless network. The method includes receiving, at an evolved NodeB (eNB), wireless signals from a plurality of user equipments (UEs). The wireless signals include a pilot signal from each UE corresponding to a common Physical-Layer Cell Identifier (PCID). The wireless signals also include a UE data message differing from a data message of another of the UEs. The method also includes determining whether a PCID collision occurs based on the wireless signals.

Offered is an apparatus for wireless communication. The apparatus includes means for receiving, at an evolved NodeB (eNB), wireless signals from a plurality of user equipments (UEs). The wireless signals include a pilot signal from each UE corresponding to a common Physical-Layer Cell Identifier (PCID). The wireless signals also include a UE data message differing from a data message of another of the UEs. The apparatus also includes means for determining whether a PCID collision occurs based on the wireless signals.

Offered is a computer program product for wireless communication in a wireless network. The computer program product includes a non-transitory computer-readable medium having non-transitory program code recorded thereon. The program code includes program code to receive, at an evolved NodeB (eNB), wireless signals from a plurality of user equipments (UEs). The wireless signals include a pilot signal from each UE corresponding to a common Physical-Layer Cell Identifier (PCID). The wireless signals also include a UE data message differing from a data message of another of the UEs. The program code also includes program code to determine whether a PCID collision occurs based on the wireless signals.

Offered is an apparatus for wireless communication. The apparatus includes a memory and a processor(s) coupled to the memory. The processor(s) is configured to receive, at an evolved NodeB (eNB), wireless signals from a plurality of user equipments (UEs). The wireless signals include a pilot signal from each UE corresponding to a common Physical-Layer Cell Identifier (PCID). The wireless signals also include a UE data message differing from a data message of another of the UEs. The processor(s) is also configured to determine whether a PCID collision occurs based on the wireless signals.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
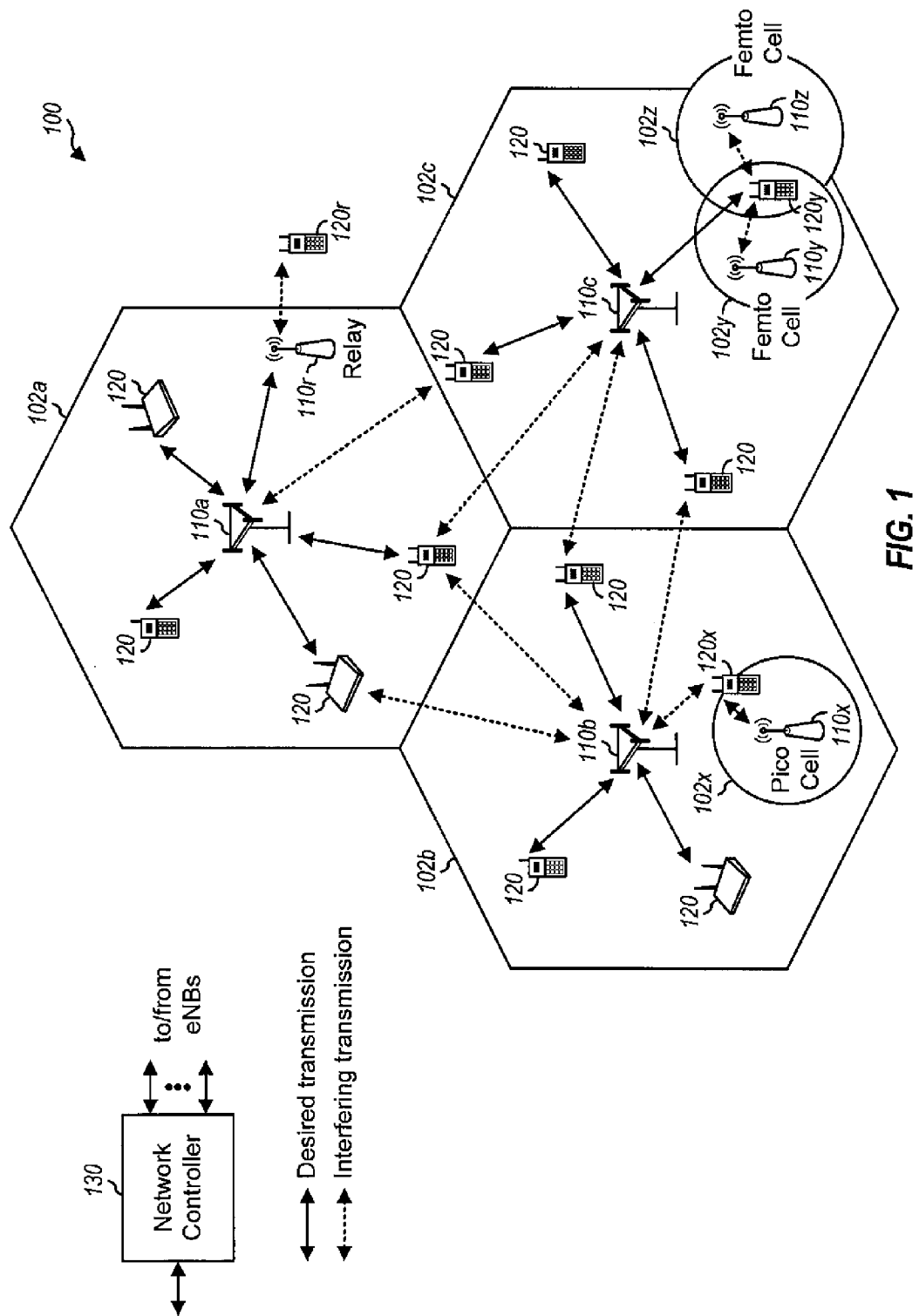
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operation. For synchronous operation, the eNodeBs may have similar frame timing, and transmissions from different eNodeBs may be approximately aligned in time.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
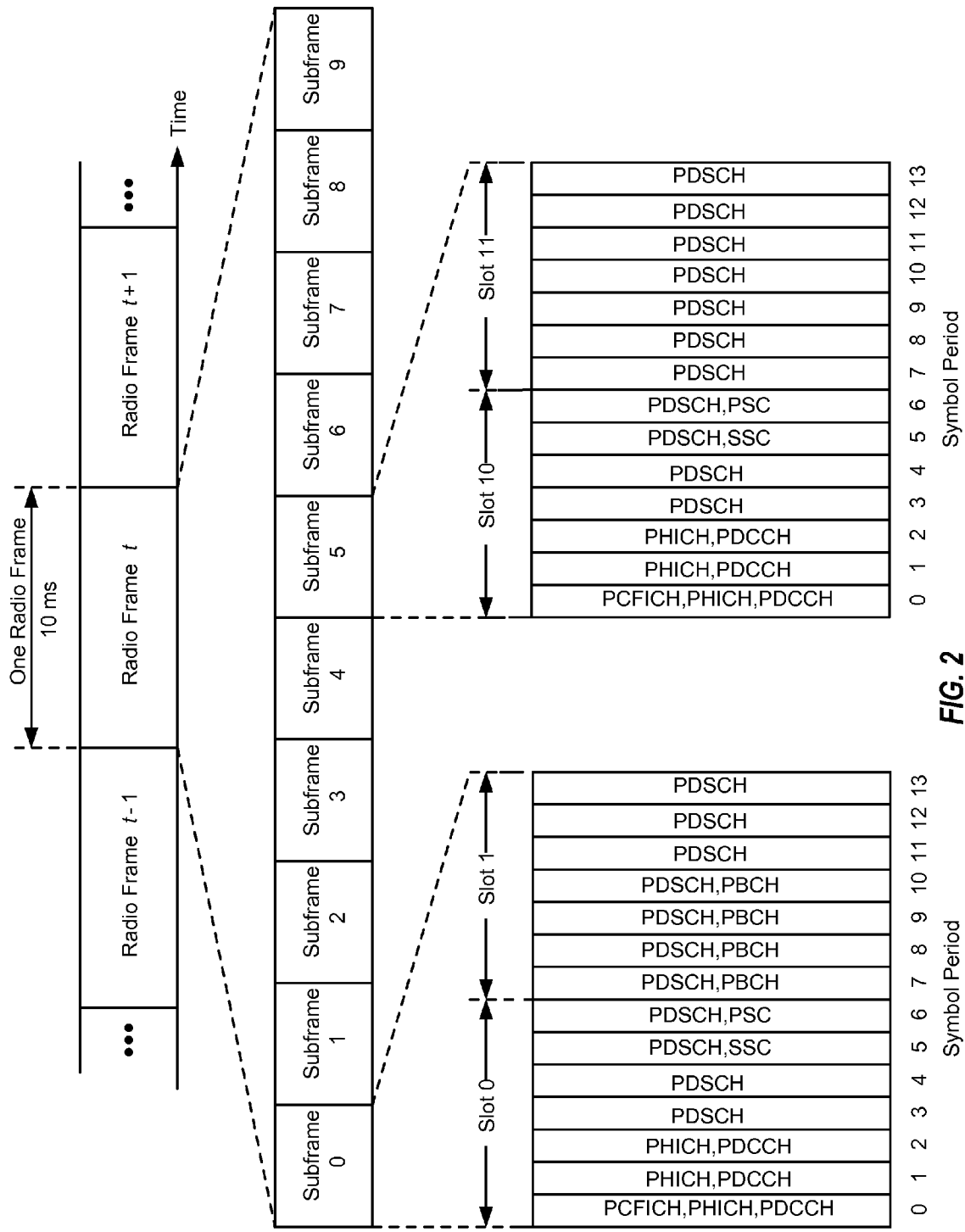
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
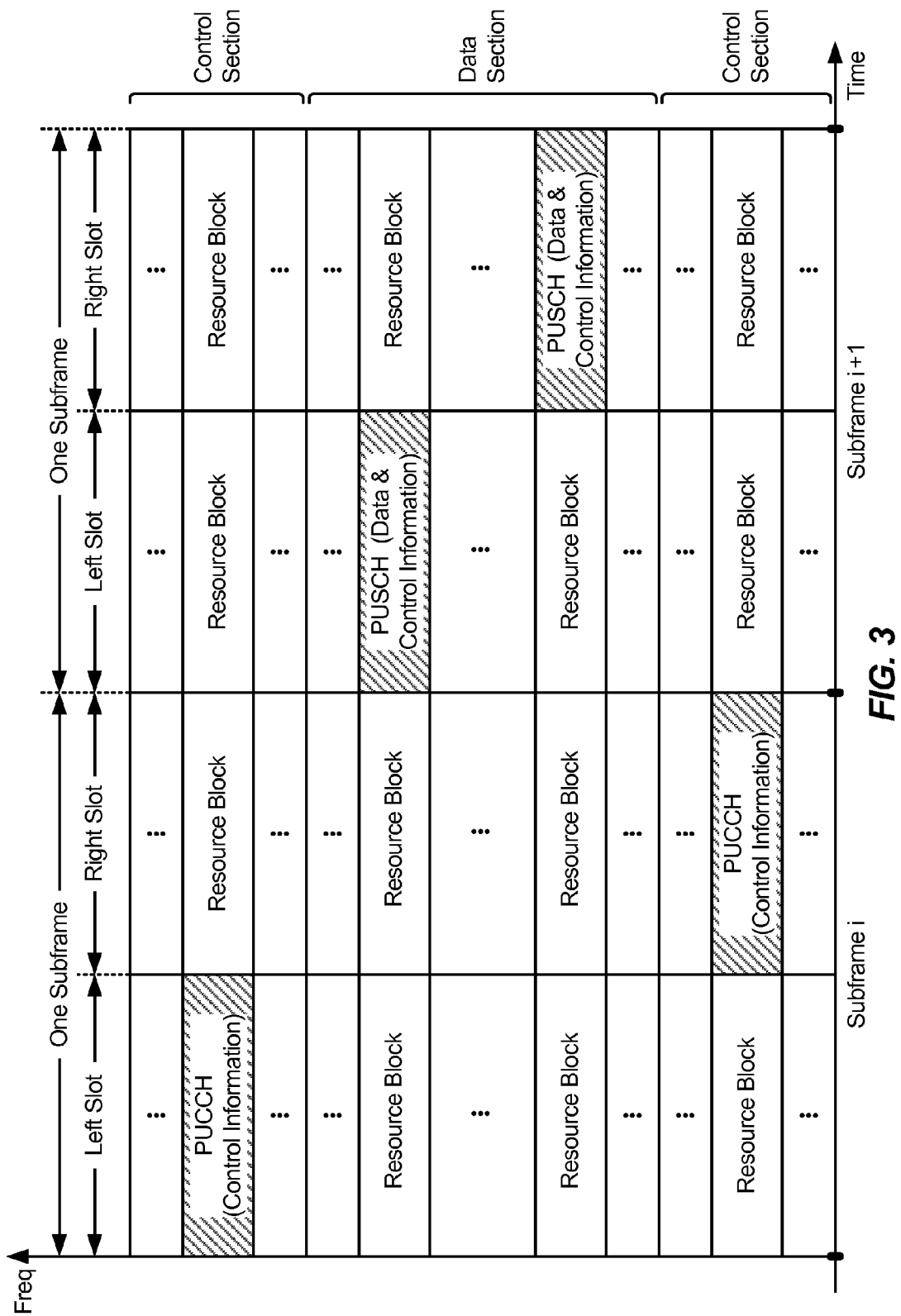
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
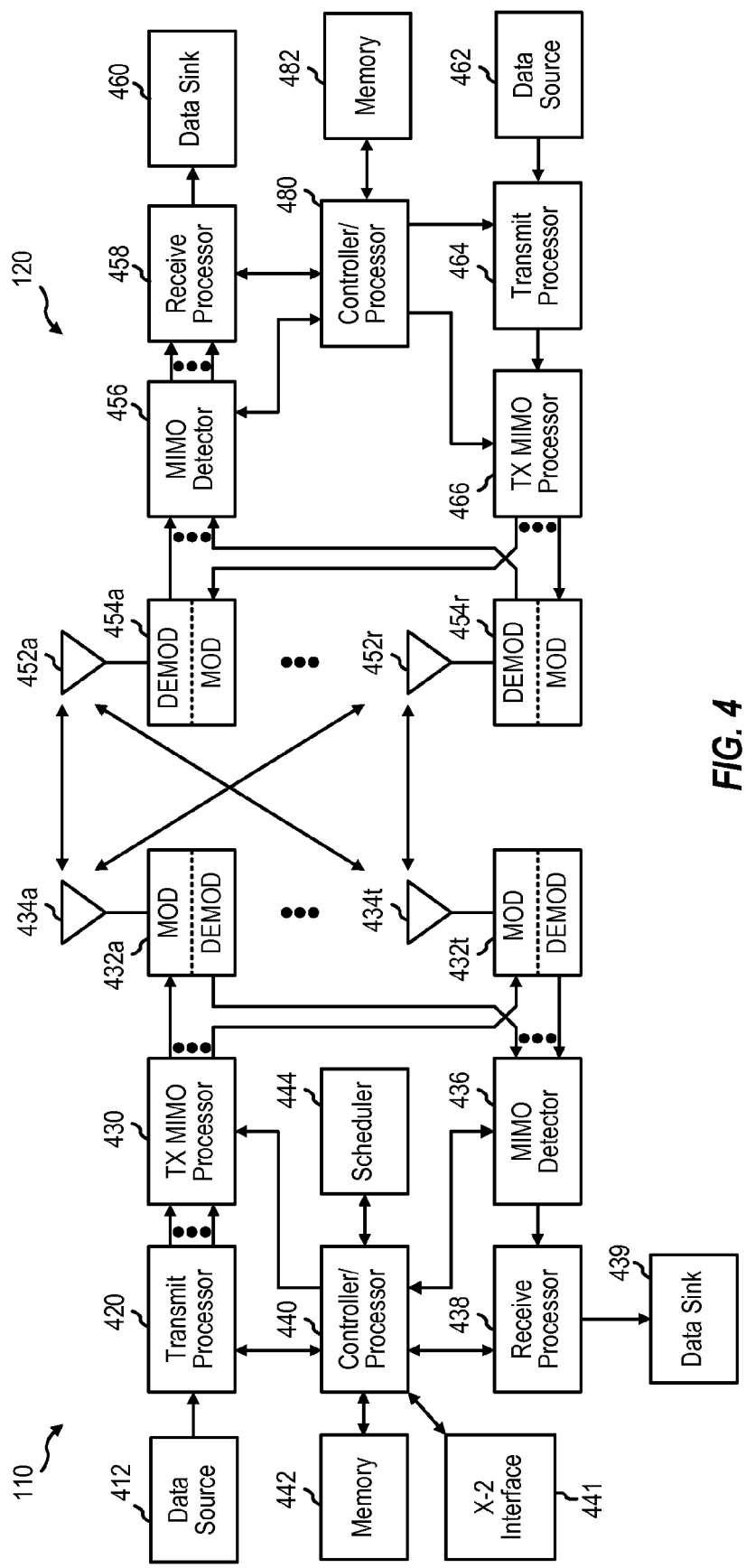
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIGS. 5-9 and/or other processes for the techniques described herein. The memories 442 and 482 may store data and program codes for the base station 110 and the UE 120, respectively. A scheduler 444 may schedule UEs for data transmission on the downlink and/or uplink.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 is (5 km÷3×108, i.e., the speed of light, 'c'). Comparing that downlink signal from the macro eNodeB to the downlink signal from a much closer femto eNodeB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Physical-Layer Cell Identifier Collisions

Wireless networks, such as Long Term Evolution (LTE) networks, are divided into cells. Each cell may, for example, be associated with an evolved Node B (eNB). That is, each eNB may represent a cell in the LTE network. Each cell has assigned a unique Global Cell Identifier (GCID). In addition, each cell has assigned a Physical-layer Cell Identifier (PCID). The physical-layer cell identifier is used in physical layer transmissions to identify a cell in both downlink and uplink transmissions. For example, different physical-layer cell identifiers result in different physical layer signals transmitted on physical downlink and physical uplink channels.

However, due to the physical-layer cell identifier using fewer bits than the global cell identifier, the range of physical-layer cell identifier values available for a cell of a wireless network is smaller than the range of global cell identifier values available for a cell. Thus, the mapping from global cell identifier to physical-layer cell identifier may not be one-to-one, and multiple global cell identifiers may share a common physical-layer cell identifier. If two nearby cells, such as neighboring cells, share a physical-layer cell identifier, a physical-layer cell identifier collision occurs. As the density of cells in a region increases, the likelihood of a physical-layer cell identifier collision also increases. For example, in a closed subscriber group of an LTE network several femto cells may have been assigned the same physical-layer cell identifier.

In case of a cell identified collision, it becomes difficult for UEs and base stations to distinguish their signals from signals of the neighboring cell. Thus, there is a need for detecting physical-layer cell identifier collisions and reporting the physical-layer cell identifier collisions to the wireless network.

According to one aspect, a User Equipment (UE) may monitor arrival paths for a Primary Synchronization Signal (PSS) and/or a Secondary Synchronization Signal (SSS). Both the primary synchronization signal and secondary synchronization signal are functions of a physical-layer cell identifier.

The value of the primary synchronization signal is physical-layer cell identifier (MOD 3). Modulo (mod) is a mathematical function where numbers "wrap around" after they reach a certain value (called the modulus) such that the result of the function is the remainder of the operand divided by the modulus. The Modulo function is expressed as V=O (MOD x) where V is a the value, O is the operand, and x is the modulus. For example, 5 (MOD 2)=1, and 12 (MOD 6)=0. Because the primary synchronization signal is the physical-layer cell identifier (MOD 3), the value primary synchronization signal is always 0, 1, or 2. Thus, PSS=PCID (MOD 3).

The value of the secondary synchronization signal is FLOOR (PCID/3). FLOOR is a mathematical function indicating the largest integer not greater than the number. Thus FLOOR(x), expressed as $\lfloor x \rfloor$, means the largest integer not greater than x. For example, FLOOR(3.5)=3, and FLOOR (2.324)=2. Thus $$SSS = \left\lfloor \frac{PCID}{3} \right\rfloor.$$

If the UE receives multiple PSSs and/or SSSs having the same physical-layer cell identifier separated in time by a large amount, the UE may indicate a physical-layer cell identifier collision has occurred. That is, physical-layer cell identifier collisions may be detected by monitoring the primary synchronization signal and/or secondary synchronization signal. The PSS and SSS transmitted from a single cell may be detected at a UE at multiple times due to the channel having multiple paths. However, if a UE detects synchronization signals corresponding to the same cell ID that are separated by more than the expected channel delay profile, the UE may determine that the signals are transmitted from two different base stations. In one aspect, time delay corresponds to a reasonable estimate of channel delay spread, which is a time for all paths of a signal to reach a UE.

Figure 5:
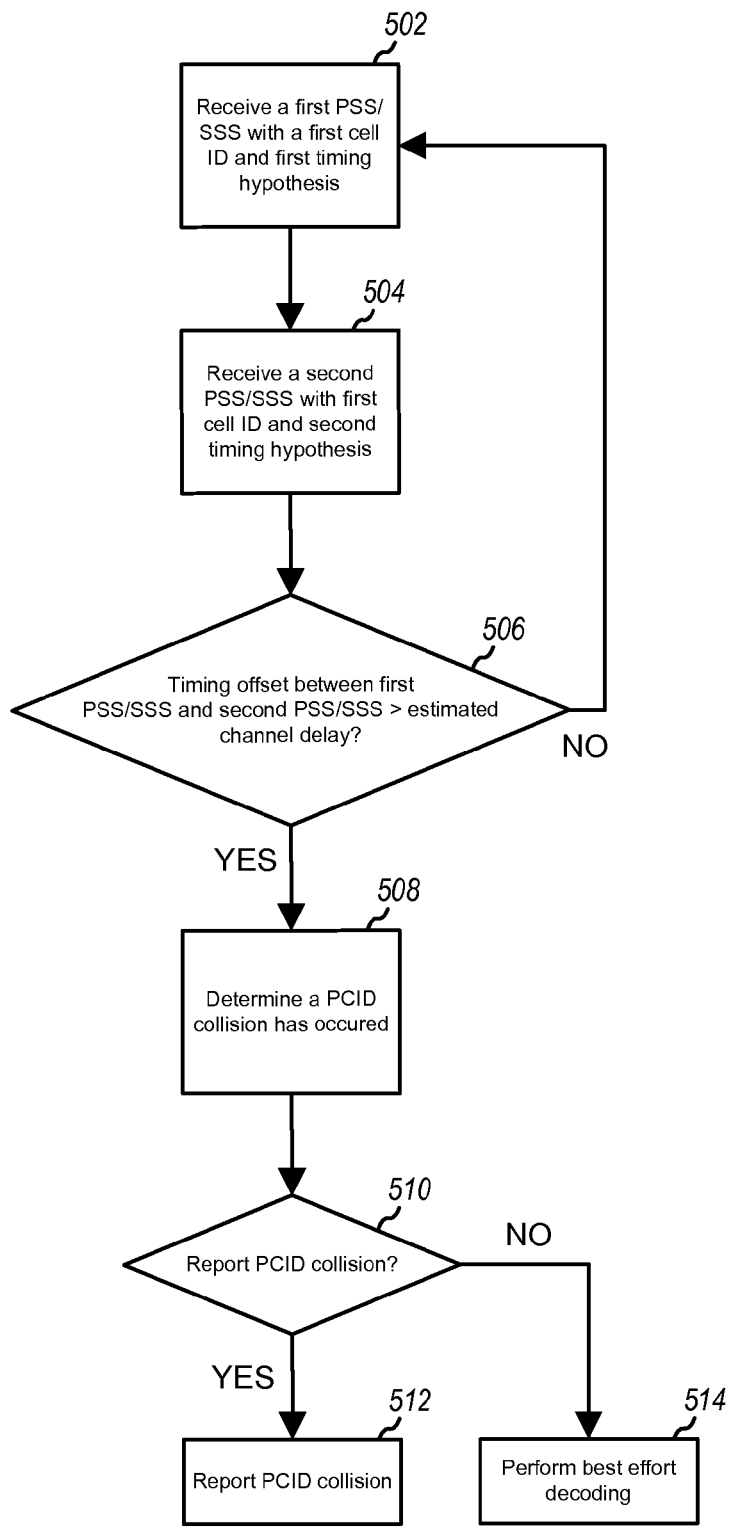
FIG. 5 is a flow chart for determining when a physical-layer cell identifier collision occurs on a wireless network according to one aspect of the present disclosure.

FIG. 5 shows a flow chart for determining when a physical-layer cell identifier collision occurs on a wireless network according to one aspect of the present disclosure. At the time the UE receives signals with the same cell ID, the UE does not necessarily know that the signals may be coming from different base stations. At block 502, a UE receives a first primary synchronization signal and/or secondary synchronization signal corresponding to a first cell ID and a first timing hypothesis. At block 504, the UE receives a second primary synchronization signal and/or secondary synchronization signal corresponding to the same first cell ID and a second timing hypothesis. At block 506, the UE determines if a timing offset between the first primary synchronization signal/secondary synchronization signal and the second primary synchronization signal/secondary synchronization signal is greater than an estimated channel delay. If the timing offset is greater than the estimated channel delay, then the UE proceeds to block 508 and determines a physical-layer cell identifier collision has occurred. According to one aspect, the UE may flag the physical-layer cell identifier for further collision determination, as discussed below. If the timing offset is less than the estimated channel delay, then the process returns to block 502.

After a physical-layer cell identifier collision is determined by the UE, the UE proceeds to block 510 to determine if the UE will report the physical-layer cell identifier collision. If the UE is to report the physical-layer cell identifier collision, then the processing proceeds to block 512 and reports the physical-layer cell identifier collision. Otherwise, the UE performs best effort decoding at block 514.

According to one aspect, the UE reports the physical-layer cell identifier collision to a fallback eNB. For example, the UE may report the physical-layer cell identifier collision to a macro eNB when the UE determines the physical-layer cell identifier collision is between two femto eNBs. According to one aspect, to aid in locating the fallback eNB the UE may perform interference cancellation to reduce interference caused by the primary synchronization signals/secondary synchronization signals from eNBs with identical physical-layer cell identifiers. In another aspect, the UE attempts to contact the serving or interfering femto cell when a macro eNB is not available. Best efforts may be used to contact the serving or interfering femto eNB.

According to another aspect, the UE may transmit a signal that one or more of the eNBs involved in the physical-layer cell identifier collision may use to identify the physical-layer cell identifier collision. For example, a separate reserved resource may be available for each physical-layer cell identifier such that the UE transmits a signal on the reserved resource corresponding to the physical-layer cell identifier involved in the physical-layer cell identifier collision. eNBs may monitor the reserved resource corresponding to their assigned physical-layer cell identifier to determine if a physical-layer cell identifier collision occurs.

According to yet another aspect, a common reserved resource may be available on which the UE transmits a signal corresponding to the physical-layer cell identifier involved in the physical-layer cell identifier collision. All eNBs may monitor the reserved resource and determine if it is involved in a physical-layer cell identifier collision by comparing the physical-layer cell identifier transmitted on the common reserved resource with its physical-layer cell identifier.

According to one aspect, if the UE decodes a Physical Broadcast Channel (PBCH) corresponding to the same cell ID associated with a different timing hypothesis (or a timing hypothesis difference that is larger than a certain threshold) then the UE determines that a cell ID collision has occurred. Alternately, if the UE decodes the PBCH corresponding to the same cell ID with different payloads, then the UE determines that a cell ID collision has occurred. As a payload is determined by transmission settings or cell parameters, to ensure that different base stations transmit different payloads, reserve bits in the PBCH may occasionally be used.

Figure 6A:
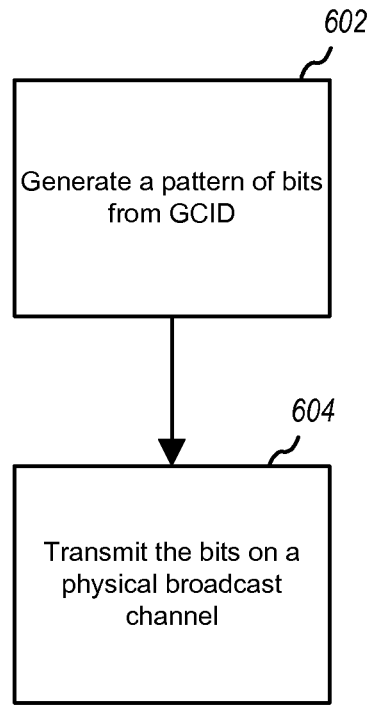
FIG. 6A is a flow chart illustrating a method for detecting physical-layer cell identifier collisions in a wireless network according to one aspect of the present disclosure.

FIG. 6A is a flow chart illustrating a method for detecting physical-layer cell identifier collisions in a wireless network using reserve bits, according to one aspect. At block 602 an eNB generates a pattern of bits from the eNB's global cell identifier. At block 604, the eNB transmits the generated pattern of bits on a PBCH. The transmission may occur periodically, e.g., some PBCHs may include the pattern, while others PBCHs may not.

According to one aspect, the eNB may generate bits for a subset of the unused (reserved) bits in the payload of the PBCH. The eNB may generate the selected unused bits by generating bits from a random number generator seeded with the eNB's global cell identifier. The eNB may alternatively generate the selected unused bits by directly mapping the global cell identifier into the selected unused bits.

Figure 6B:
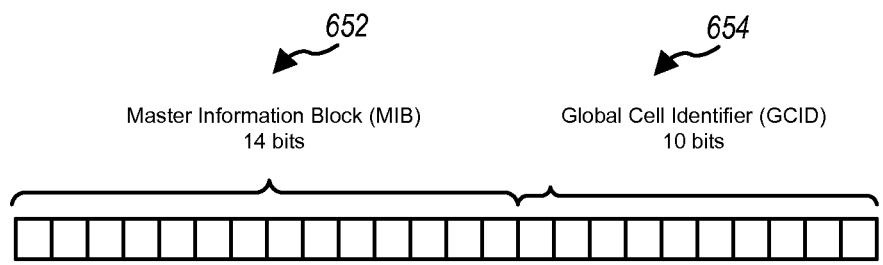
FIG. 6B is an illustration of 24 bits of a payload on a physical broadcast channel according to one aspect of the present disclosure.

FIG. 6B is an illustration of 24 bits of a payload on a physical broadcast channel. The physical broadcast channel payload includes a first portion 652 corresponding to a Master Information Block (MIB). The physical broadcast channel payload also includes a second portion 654 corresponding to a global cell identifier of the transmitting eNB, as disclosed above. For example, if two eNBs have identical bandwidth, number of transmitting antennas, and physical-layer cell identifier, the two eNBs will transmit physical broadcast channel payloads having identical bits in the first portion 652 representing the master information block. The second portion 654 may represent the global cell identifier allowing a UE to differentiate payloads from two eNBs with otherwise identical configurations (except for the unique global cell identifier modulated bits). Such a reserve bit configuration may be implemented by an eNB at all times or certain times depending on various conditions.

The broadcast bits corresponding to the global cell identifier allow a UE to differentiate payloads on the physical broadcast channel from eNBs when the eNBs have identical physical-layer cell identifiers. Legacy UEs connected to the wireless network are not affected by the transmitted bits corresponding to the global cell identifier because the bits were previously reserved. According to another aspect, the broadcast bits corresponding to the global cell identifier are for global cell identifier detection and/or validation. For example, the broadcast bits decoded at the UE from the physical broadcast channel payload may be used by the UE to validate the global cell identifier determined from the detecting eNBs during cell searching.

In a synchronized network, when a physical-layer cell identifier collision occurs, the primary synchronization signals/secondary synchronization signals from the eNBs having identical physical-layer cell identifiers may be identical signals. That is, if the two eNBs having identical physical-layer cell identifiers also have identical bandwidth and number of antennas, broadcast signals from the two eNBs are identical. Synchronization imprecision and/or propagation delays, however, may cause signals from a cell to be separated in time when received by a UE. In a synchronous network, when two cells with same physical-layer cell identifier collide, it may not be possible to detect collision based on primary synchronization signals/secondary synchronization detection because such signals from different eNBs are viewed by the UE as identical signals due to the overlapping physical-layer cell identifier. In this case it may not be possible to detect the different cells even through the physical broadcast channel. In this case, according to one aspect, the reserved bits of the physical broadcast channel (such as those illustrated in FIG. 6B) are used by the eNBs to differentiate the signals from each of the two eNBs having identical physical-layer cell identifiers.

Figure 7:
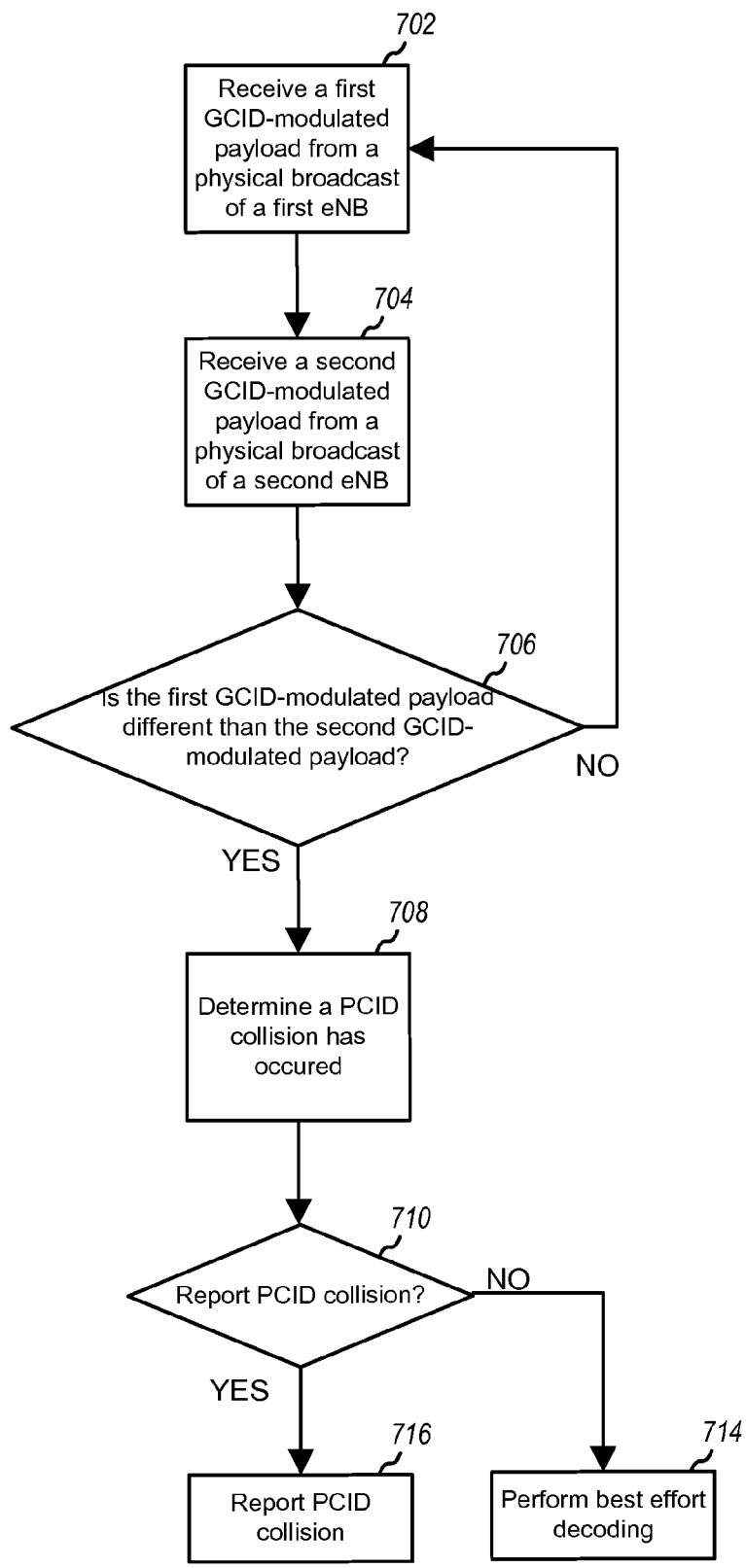
FIG. 7 is a flow chart for determining when a physical-layer cell identifier collision occurs on a wireless network according to one aspect.

FIG. 7 is a flow chart for determining when a physical-layer cell identifier collision occurs on a wireless network according to one aspect. At block 702 the UE receives a first global cell identifier-modulated payload from a physical broadcast of a first eNB. At block 704 the UE receives a second global cell identifier-modulated payload from a physical broadcast of a second eNB. At block 706 the UE determines if the first global cell identifier-modulated payload is the same as the second global cell identifier-modulated payload. If the first and second global cell identifier-modulated payloads are different, then the UE proceeds to block 708 and determine a physical-layer cell identifier collision has occurred. Otherwise, the process returns to block 702.

After the UE determines a physical-layer cell identifier collision has occurred, the UE may proceed to block 710 to determine whether to report the physical-layer cell identifier collision. If the UE is to report the physical-layer cell identifier collision, then the UE proceeds to block 716 and reports the collision, as discussed above. If the UE determines to not report the physical-layer cell identifier collision, the UE may perform best effort decoding at block 714. When a UE reports a collision, such as reporting a potentially interfering femto cell to a macro cell, the macro cell may communicate with the femto over the network backhaul to request the femto cell change its physical-layer cell identifier.

According to one aspect, in a synchronous network if interference cancellation is available on the UE, the UE may trigger physical broadcast channel decoding on each cell using interference cancellation to facilitate detection of whether physical broadcast channels with different payloads are present. To detect if a particular cell ID is involved in a cell ID collision, the UE may first cancel the PBCH and/or CRS corresponding to the cell ID and then trigger PBCH decoding again for the same cell ID. When canceling CRS, the channel estimate from PBCH data may be used to ensure that CRS of the second cell with the same cell ID, if present, is not cancelled out. The interference cancellation will cancel the second physical broadcast channel if the payloads are the same, i.e., if the physical-layer cell identifier is the same in both cells and the global cell identifier modulated bits are the same when the global cell identifier is used to set a subset of the reserved bits. That is, after interference cancellation, there will be nothing in the second physical broadcast channel payload to decode, other than noise, indicating no collision has occurred. If the payloads differ, the second decode will indicate this, and a physical-layer cell identifier collision can be declared.

A UE may perform interference cancellation as described above at certain intervals, or in certain situations, such as when a UE detects a strong Common Reference Signal (CRS) but is having difficulty decoding channels and system information blocks (SIBs). If a UE detects multiple system information blocks in physical downlink control channels (which indicates multiple base stations using the same physical-layer cell identifier) the UE may attempt to decode them using its best efforts and the techniques described in the present disclosure.

Figure 8:
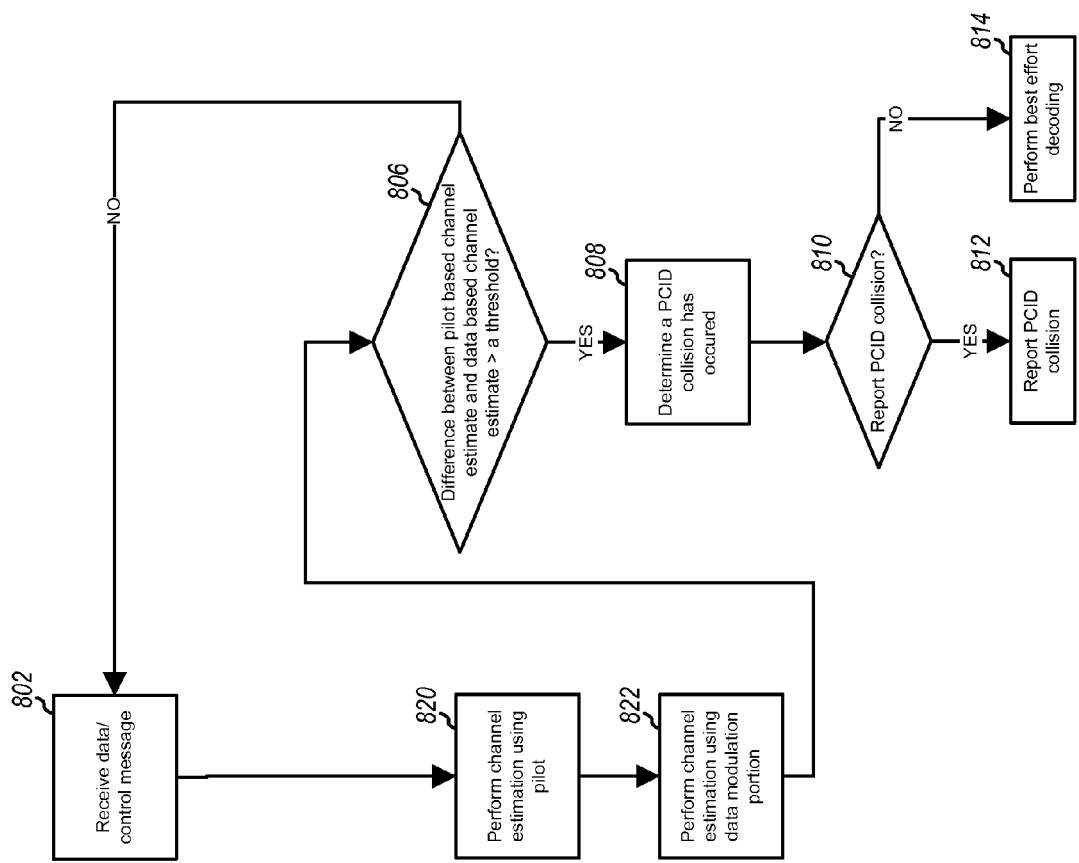
FIG. 8 is a flow chart for determining when a physical-layer cell identifier collision occurs on a wireless network according to this aspect.

According to another aspect, when a UE decodes a data or control message (such as a physical broadcast channel (PBCH) with a global cell identifier-modulated payload), the UE may perform channel estimation to determine if a physical-layer cell identifier collision has occurred on the wireless network, instead of fully decoding the message. FIG. 8 is a flow chart for determining when a physical-layer cell identifier collision occurs on a wireless network according to this aspect. At block 802 the UE receives a data/control message, such as the PBCH with the GCID modulated payload. At block 820 the UE performs a pilot based channel estimation using pilots, such as Common Reference Signal (CRS) or UE-RS. The spreading sequence of the common reference signal/UE-RS is derived from the eNB's physical-layer cell identifier.

At block 822 the UE performs a data based channel estimation using the data modulation portion of the decoded data/control message, such as the PBCH with the GCID modulated payload. If two eNBs transmit different data, then the channel estimate from data will only be the channel estimate of the eNB that transmitted that data. On the other hand, if there was no cell ID collision, the channel estimate based on the pilots and channel seen on data are similar. This can be used to determine if a cell ID collision has occurred. An example is when the average of the ratio of the two channel estimates differs significantly from an expected value, such as when a phase of the average ratio is significantly different from zero. Thus, if the two channel estimates are mismatched, the UE determines a cell ID collision has occurred.

The techniques described may also apply during uplink communications received by an eNB. Such an uplink collision may occur when one or more UEs are properly transmitting to the eNB while one or more other UEs is connected to a neighboring base station sharing the same cell ID as the eNB. In one aspect, an eNB may determine that a cell ID collision has occurred if the channel estimated from the pilots transmitted by its UE differs significantly from the channel estimated from the data sent by the UE.

In another aspect, an eNB may detect cell ID collision if it receives uplink transmissions that use parameters corresponding to the eNB's cell ID from a UE that was not scheduled by that particular eNB.

At block 806 the UE determines if the difference between the pilot based channel estimate and the channel estimate based on the data modulation portion is larger than a predetermined threshold. If the difference is larger than a threshold, then the UE proceeds to block 808 and determines a physical-layer cell identifier collision has occurred. Otherwise, the process returns to block 802.

After the UE determines a physical-layer cell identifier collision has occurred, the logic may proceed to block 810 to determine whether to report the physical-layer cell identifier collision. If the UE is to report the physical-layer cell identifier collision, then the logic proceeds to block 812 and reports the collision as disclosed above. If the UE determines to not report the physical-layer cell identifier collision, the UE may perform best effort decoding at block 814.

Performing channel estimation instead of fully decoding the physical broadcast channel payloads reduces overhead on the UE and increases efficiency of the UE.

According to one aspect, certain uplink resources may be reserved for a UE to transmit a signal that the eNB can use to identify physical-layer cell identifier collisions. For example, the resource reserved could be different for cells with different cell physical-layer cell identifiers. The UE may transmit a known signal in this reserved resource. An eNB may determine if its physical-layer cell identifier is involved in a collision if the eNB detects the known signal in the reserved space corresponding to that physical-layer cell identifier. Alternately, a common resource may be reserved for all physical-layer cell identifiers. The UE may transmit a signal in that reserved resource depending on the physical-layer cell identifier that the UE detects is involved in a collision. The eNB may monitor the reserved resource. If the eNB detects a signal corresponding to its own physical-layer cell identifier the eNodeB may infer that it may be involved in a physical-layer cell identifier collision.

Figure 9:
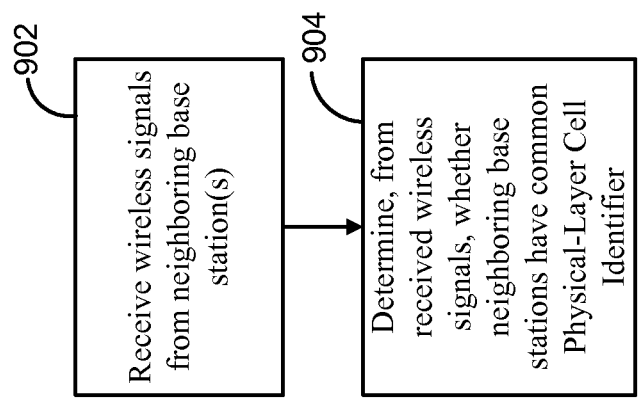
FIG. 9 illustrates a method for detecting and reporting physical-layer cell identifier collisions according to one aspect of the present disclosure.

FIG. 9 illustrates a method for detecting and reporting physical-layer cell identifier collisions according to one aspect of the present disclosure. In block 902, a UE receives wireless signals from neighboring base stations. In block 904 a UE determines, from the received wireless signals, whether the neighboring base stations have a common Physical-Layer Cell Identifier (PCID).

Figure 10:
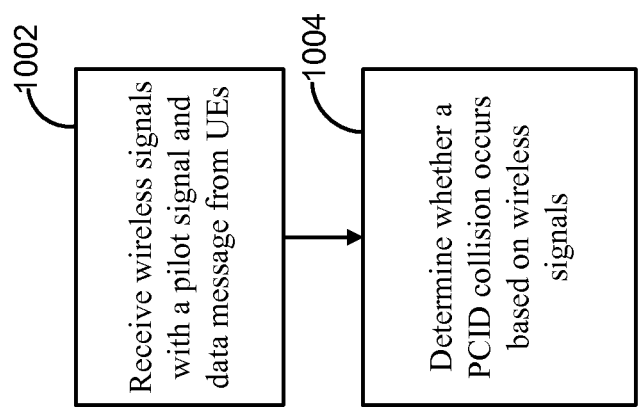
FIG. 10 illustrates a method for detecting and reporting physical-layer cell identifier collisions according to one aspect of the present disclosure.

FIG. 10 illustrates a method for detecting and reporting physical-layer cell identifier collisions according to one aspect of the present disclosure. In block 1002 an eNB receives wireless signals from a plurality of UEs. The wireless signals include a pilot signal from each UE corresponding to a common PCID. The wireless signals also include a UE data message differing from a data message of another of the UEs. In block 1004 the eNB determines whether a PCID collision occurs based on the wireless signals.

A UE may have means for receiving wireless signals from a plurality of neighboring base stations, and means for determining, from the received wireless signals, whether the neighboring base stations have a common Physical Cell-Layer Identifier (PCID). In one aspect, the aforementioned means may be the processor(s), the controller/processor 480, the memory 482, the receive processor 458, the demodulators 454a, and the antennas 452a configured to perform the functions recited by the aforementioned means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of communicating in a wireless network, the method comprising:
  receiving, at a user equipment (UE), wireless signals from at least two base stations;
  determining whether a Physical-Layer Cell Identifier (PCID) collision exists, from the wireless signals, based at least in part on:
    performing a first channel estimate corresponding to a data transmission in the wireless signals using a pilot signal;
    performing a second channel estimate for the data transmission in the wireless signals using a data modulation portion; and
    determining whether PCID collision exists based at least in part on the first and second channel estimates; and
  reporting the PCID collision to at least one neighboring base station based at least in part on the determination that the PCID collision exists.

2. The method of claim 1, further comprising reporting the PCID collision to at least one other base station.

3. The method of claim 1, in which the reporting comprises reporting a global cell identifier involved in the PCID collision.

4. The method of claim 1, further comprising reporting the PCID collision on a reserved uplink resource.

5. The method of claim 1, in which the determining further comprises determining the at least two base stations have the common physical-layer cell identifier when receiving a plurality of system information blocks (SIBs) corresponding to the common physical-layer cell identifier.

6. The method of claim 5, in which the determining further comprises determining the at least two base stations have the common physical-layer cell identifier when receiving a plurality of physical downlink control channels (PDCCHs) for the SIBs corresponding to the common physical-layer cell identifier.

7. The method of claim 1, in which the determining further comprises receiving a plurality of Physical Broadcast Channels (PBCHs) corresponding to the common physical-layer cell identifier, the PBCHs having different payloads.

8. The method of claim 7, in which the plurality of different payloads comprise a first payload and a second payload based on a Global Cell Identifier (GCID).

9. The method of claim 7, in which the determining further comprises:
  decoding a first payload corresponding to a first cell identifier;
  performing interference cancellation by removing a signal corresponding to the first payload from a received signal;
  triggering a second decoding for the first cell identifier; and
  determining the PCID collision further based at least in part on decoding of a second payload differing from the first payload after canceling the first payload from the received signal being successful.

10. The method of claim 9, in which the interference cancellation comprises pilot and data cancellation.

11. The method of claim 10, in which the pilot cancellation makes use of channel estimates of a data signal.

12. The method of claim 1, in which the pilot signal comprises one of a Common Reference Signal (CRS) and a user equipment reference signal (UE-RS).

13. The method of claim 1, in which a first base station of the at least two base stations is a non-serving base station and a second base station of the at least two base stations is a serving base station.

14. An apparatus for wireless communication, comprising:
  means for receiving wireless signals from at least two base stations;
  means for determining whether a Physical-Layer Cell Identifier (PCID) collision exists, from the wireless signals, based at least in part on:
    performing a first channel estimate corresponding to a data transmission in the wireless signals using a pilot signal;
    performing a second channel estimate for the data transmission in the wireless signals using a data modulation portion; and
    determining whether PCID collision exists based at least in part on the first and second channel estimates; and
  means for reporting the PCID collision to at least one neighboring base station based at least in part on the determination that the PCID collision exists.

15. A non-transitory computer-readable medium having non-transitory program codes which, when executed by a processor, cause the processor to:
  receive, at a user equipment (UE), wireless signals from at least two base stations;
  determine whether a Physical-Layer Cell Identifier (PCID) collision exists, from the wireless signals, based at least in part on:
    performing a first channel estimate corresponding to a data transmission in the wireless signals using a pilot signal;
    performing a second channel estimate for the data transmission in the wireless signals using a data modulation portion; and
    determining whether PCID collision exists based at least in part on the first and second channel estimates; and
  report the PCID collision to at least one neighboring base station based at least in part on the determination that the PCID collision exists.

16. An apparatus for wireless communication, comprising:
  a memory; and
  at least one processor coupled to the memory, the at least one processor being configured:
    to receive wireless signals from at least two base stations; and
    to determine whether a Physical-Layer Cell Identifier (PCID) collision exists, from the wireless signals, based at least in part on:
      performing a first channel estimate corresponding to a data transmission in the wireless signals using a pilot signal;
      performing a second channel estimate for the data transmission in the wireless signals using a data modulation portion; and
      determining whether PCID collision exists based at least in part on the first and second channel estimates; and
    to report the PCID collision to at least one neighboring base station based at least in part on the determination that the PCID collision exists.

17. The apparatus of claim 16, in which the at least one processor is further configured to report the PCID collision to at least one other base station.

18. The apparatus of claim 16, in which the reporting comprises reporting a global cell identifier involved in the PCID collision.

19. The apparatus of claim 16, in which the at least one processor is further configured to report the PCID collision on a reserved uplink resource.

20. The apparatus of claim 16, in which the at least one processor being configured to determine comprises the at least one processor configured to determine whether the at least two base stations have the common physical-layer cell identifier when receiving a plurality of system information blocks (SIBs) corresponding to the common physical-layer cell identifier.

21. The apparatus of claim 20, in which the at least one processor being configured to determine comprises the at least one processor configured to determine whether the at least two base stations have the common physical-layer cell identifier when receiving a plurality of physical downlink control channels (PDCCHs) for the SIBs corresponding to the common physical-layer cell identifier.

22. The apparatus of claim 16, in which the at least one processor being configured to determine further comprises the at least one processor configured to receive a plurality of Physical Broadcast Channels (PBCHs) corresponding to the common physical-layer cell identifier, the PBCHs having different payloads.

23. The apparatus of claim 22, in which the plurality of different payloads comprise a first payload and a second payload based on a Global Cell Identifier (GCID).

24. The apparatus of claim 16, in which the at least one processor being configured to determine further comprises the at least one processor configured:
to decode a first payload corresponding to a first cell identifier;
to perform interference cancellation by removing a signal corresponding to the first payload from a received signal;
to trigger a second decoding for the first cell identifier; and
to determine the PCID collision further based at least in part on decoding of a second payload differing from the first payload after canceling the first payload from the received signal being successful.

25. The apparatus of claim 24, in which the interference cancellation comprises pilot and data cancellation.

26. The apparatus of claim 24, in which the pilot cancellation makes use of channel estimates of a data signal.

27. The apparatus of claim 16, in which the pilot signal comprises one of a Common Reference Signal (CRS) and a user equipment reference signal (UE-RS).

28. A method of communicating in a wireless network, the method comprising:
receiving, at an evolved NodeB (eNB), wireless signals from a plurality of user equipments (UEs), the wireless signals including a pilot signal from each UE corresponding to a common Physical-Layer Cell Identifier (PCID), and a data message from a first UE of the plurality of UEs being different from a data message from a second UE of the plurality of UEs;
performing a first channel estimate corresponding to a data transmission using a pilot signal from one of the plurality of UEs;
performing a second channel estimate for the data transmission using a data modulation portion; and
declaring a PCID collision when the first channel estimate differs from the second channel estimate beyond a threshold difference.

29. The method of claim 28, further comprising detecting whether the at least one of the first UE or the second UE was scheduled by the eNB, wherein
declaring the PCID collision is based at least in part on determining that the at least one of the first UE or the second UE was not scheduled by the eNB.

30. An apparatus for wireless communication, comprising:
means for receiving, at an evolved NodeB (eNB), wireless signals from a plurality of user equipments (UEs), the wireless signals including a pilot signal from each UE corresponding to a common Physical-Layer Cell Identifier (PCID), and a data message from a first UE of the plurality of UEs being different from a data message from a second UE of the plurality of UEs;
means for performing a first channel estimate corresponding to a data transmission using a pilot signal from one of the plurality of UEs;
means for performing a second channel estimate for the data transmission using a data modulation portion; and
means for declaring a PCID collision when the first channel estimate differs from the second channel estimate beyond a threshold difference.

31. A non-transitory computer-readable medium having non-transitory program codes, which when executed by a processor, cause the processor to:
receive, at an evolved NodeB (eNB), wireless signals from a plurality of user equipments (UEs), the wireless signals including a pilot signal from each UE corresponding to a common Physical-Layer Cell Identifier (PCID), and a data message from a first UE of the plurality of UEs being different from a data message from a second UE of the plurality of UEs;
perform a first channel estimate corresponding to a data transmission using a pilot signal from one of the plurality of UEs;
perform a second channel estimate for the data transmission using a data modulation portion; and
declare a PCID collision when the first channel estimate differs from the second channel estimate beyond a threshold difference.

32. An apparatus for wireless communication, comprising:
a memory; and
at least one processor coupled to the memory, the at least one processor being configured:
to receive, at an evolved NodeB (eNB), wireless signals from a plurality of user equipments (UEs), the wireless signals including a pilot signal from each UE corresponding to a common Physical-Layer Cell Identifier (PCID), and a data message from a first UE of the plurality of UEs being different from a data message from a second UE of the plurality of UEs;
to perform a first channel estimate corresponding to a data transmission using a pilot signal from one of the plurality of UEs;
to perform a second channel estimate for the data transmission using a data modulation portion; and
to declare a PCID collision when the first channel estimate differs from the second channel estimate beyond a threshold difference.

33. The apparatus of claim 32, in which the at least one processor is further configured to determine whether the at least one of the first UE or the second UE was scheduled by the eNB; and wherein the at least one processor is configured to declare the PCID collision based further at least in part on determining that the at least one of the first UE or the second UE was not scheduled by the eNB.

* * * * *